United States Patent
Li et al.

(10) Patent No.: US 11,575,941 B2
(45) Date of Patent: Feb. 7, 2023

(54) PARALLEL PROCESSING IN VIDEO CODING

(71) Applicant: TENCENT AMERICA LLC, Palo Alto, CA (US)

(72) Inventors: Ling Li, Seoul (KR); Xiang Li, Saratoga, CA (US); Bin Zhu, Palo Alto, CA (US); Soo-Chul Han, Palo Alto, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/499,700

(22) Filed: Oct. 12, 2021

(65) Prior Publication Data
US 2022/0312039 A1    Sep. 29, 2022

Related U.S. Application Data

(60) Provisional application No. 63/164,633, filed on Mar. 23, 2021.

(51) Int. Cl.
*H04N 19/70*        (2014.01)
*H04N 19/46*        (2014.01)
(Continued)

(52) U.S. Cl.
CPC ........... *H04N 19/70* (2014.11); *H04N 19/174* (2014.11); *H04N 19/1883* (2014.11); *H04N 19/46* (2014.11)

(58) Field of Classification Search
CPC .. H04N 19/70; H04N 19/174; H04N 19/1883; H04N 19/46
(Continued)

(56) References Cited

U.S. PATENT DOCUMENTS

2020/0099924 A1*   3/2020   Seregin ............... H04N 19/122
2020/0186821 A1    6/2020   Park et al.
(Continued)

FOREIGN PATENT DOCUMENTS

| CN | 103636215 A | * | 3/2014 | ........... H04N 19/119 |
| CN | 112055964 A | * | 12/2020 | ........... H04N 19/119 |
| WO | WO 2020/197155 A1 | | 10/2020 | |

OTHER PUBLICATIONS

US 11,418,784 B2, 08/2022, Deng (withdrawn)*
(Continued)

*Primary Examiner* — Albert Kir
(74) *Attorney, Agent, or Firm* — ArentFox Schiff LLP

(57) ABSTRACT

A method of video processing by a video processor includes receiving a first syntax element in a coded video bitstream. The first syntax element can be a high level syntax element and indicate whether a height of each of a plurality of pictures in a video sequence of the coded video bitstream is equal to or larger than a width of the respective picture in the video sequence of the coded video bitstream. The pictures in the video sequence of the coded video can be processed in an orientation that is determined according to the first syntax element indicating whether the height of each of the plurality of pictures in the video sequence of the coded video is guaranteed to be equal to or larger than the width of the respective picture in the video sequence.

19 Claims, 12 Drawing Sheets

(51) Int. Cl.
*H04N 19/174* (2014.01)
*H04N 19/169* (2014.01)

(58) Field of Classification Search
USPC .................................................. 375/240.26
See application file for complete search history.

(56) References Cited

U.S. PATENT DOCUMENTS

| | | | |
|---|---|---|---|
| 2020/0288130 A1* | 9/2020 | Seregin | H04N 19/12 |
| 2020/0296370 A1* | 9/2020 | Egilmez | H04N 19/61 |
| 2022/0256195 A1* | 8/2022 | Zhang | H04N 19/176 |
| 2022/0295076 A1* | 9/2022 | Chen | H04N 19/122 |

OTHER PUBLICATIONS

International Search Report and Written Opinion dated Feb. 1, 2022 in International Application No. PCT/US 21/55365, 10 pgs.
Zhao, et al., Wavefront Parallel Processing for AV1 Encoder. 2018 Picture Coding Symposium (PC). IEEE, 2018, https://ieeexplore.ieeee.org/abstract/document/8456283, 5 pgs.

* cited by examiner

PARALLEL PROCESSING IN VIDEO CODING

INCORPORATION BY REFERENCE

This present disclosure claims the benefit of priority to U.S. Provisional Application No. 63/164,633, "Improvement on Parallel Processing" filed on Mar. 23, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example, 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers a technique is referred to as "spatial merge". In spatial merge, a current block comprises samples that have been found by the encoder during the motion search process to be predictable from a previous block of the same size that has been spatially shifted. Instead of coding that MV directly, the MV can be derived from metadata associated with one or more reference pictures, for example, from the most recent (in decoding order) reference picture, using the MV associated with either one of several merge candidate positions. In H.265, the MV prediction can use predictors from the same reference picture that the neighboring block is using.

SUMMARY

Aspects of the disclosure provide a method of video processing by a video processor. The method can include receiving a first syntax element in a coded video bitstream. The first syntax element can be a high level syntax element and indicate whether a height of each of a plurality of pictures in a video sequence of the coded video bitstream is guaranteed to be equal to or larger than a width of the respective picture in the video sequence of the coded video bitstream. The pictures in the video sequence of the coded video can be processed in an orientation that is determined according to the first syntax element indicating whether the height of each of the plurality of pictures in the video sequence of the coded video is equal to or larger than the width of the respective picture in the video sequence.

In an embodiment, the first syntax element is transmitted in a supplemental enhancement information (SEI) message, a video usability information (VUI) parameter set, or a sequence parameter set (SPS). In an embodiment, a first value of the first syntax element indicates the width of each of the pictures in the video sequence is smaller than the height of the respective picture in the video sequence. A second value of the first syntax element indicates the width of the pictures in the video sequence may or may not be smaller than the height of the pictures in the video sequence. The first syntax element can be inferred to have the second value when the first syntax element is not signaled in the bitstream.

In an embodiment, an input video sequence corresponding to the video sequence of the coded video bitstream at an encoder has a height smaller than a width. The height of the input video sequence is coded as the width of the pictures in the video sequence of the coded video bitstream, and the width of the input video sequence is coded as the height of the pictures in the video sequence of the coded video bitstream.

An embodiment of the method can further include receiving a second syntax element indicating the width of the pictures in the video sequence, and receiving a third syntax element indicating a difference between the height of the pictures in the video sequence and the width of the pictures in the video sequence, the difference being an unsigned integer. For example, the height of the pictures in the video sequence can be determined to be a sum of a value of the width indicated by the second syntax element and the unsigned integer.

In an embodiment, in response to the first syntax element indicating that the height of each of the pictures in the video sequence of the coded video bitstream is equal to or larger than the width of each of the pictures in the video sequence, one or more of the pictures in the video sequence can be processed using wavefront parallel processing (WPP).

In an embodiment, a fourth syntax element that is signaled in a slice level in the coded video bitstream can be received. The fourth syntax element can indicate a coding tree unit (CTU) size for a slice in the video sequence. In an embodiment, a plurality of fourth syntax elements that are each associated with a respective one of a plurality of slices in the video sequence can be received. The plurality of fourth syntax elements can indicate different CTU sizes for the respective slices of different types. In an embodiment, among the plurality of the slices, a slice of type I has a smaller CTU size than other slice types.

In an embodiment, a fifth syntax element that is signaled in a picture level can be received in the coded video bitstream. The fifth syntax element can indicate a CTU size for one of the pictures in the video sequence. In an embodiment, a sixth syntax element that is included in a sequence parameter set (SPS) can be received in the coded video bitstream and indicates a first CTU size of the video sequence. A seventh syntax element that is signaled at a picture level or a slice level can be received and indicates a second CTU size of a respective picture or a respective slice in the video sequence. In an example, the first CTU size is a maximum CTU size of the video sequence, and the second CTU size is smaller than the maximum CTU size.

Aspects of the disclosure provide an apparatus of video processing. The apparatus can include circuitry configured to receive a first syntax element in a coded video bitstream. The first syntax element can be a high level syntax element and indicate whether a height of each of a plurality of pictures in a video sequence of the coded video bitstream is guaranteed to be equal to or larger than a width of the respective picture in the video sequence of the coded video bitstream. The pictures in the video sequence of the coded video can be processed in an orientation that is determined according to the first syntax element indicating whether the height of each of the plurality of pictures in the video sequence of the coded video is equal to or larger than the width of the respective picture in the video sequence.

Aspects of the disclosure further provide another method of video processing by a video processor. The method can include including, in a coded video bitstream, a first syntax element being a high level syntax element and indicating whether a height of each of a plurality of pictures in a video sequence of the coded video bitstream is guaranteed to be equal to or larger than a width of the respective picture in the video sequence of the coded video bitstream. The pictures in the video sequence of the coded video are processed in an orientation that is determined according to the first syntax element indicating whether the height of each of the plurality of pictures in the video sequence of the coded video is equal to or larger than the width of the respective picture in the video sequence.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

I. Encoder and Decoder Systems

Figure 1:
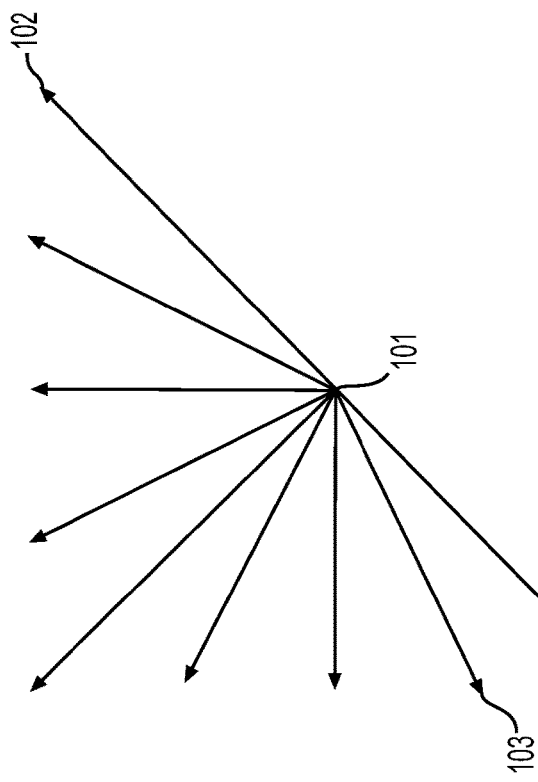
FIG. 1 is a schematic illustration of an exemplary subset of intra prediction modes.
Figure 2:
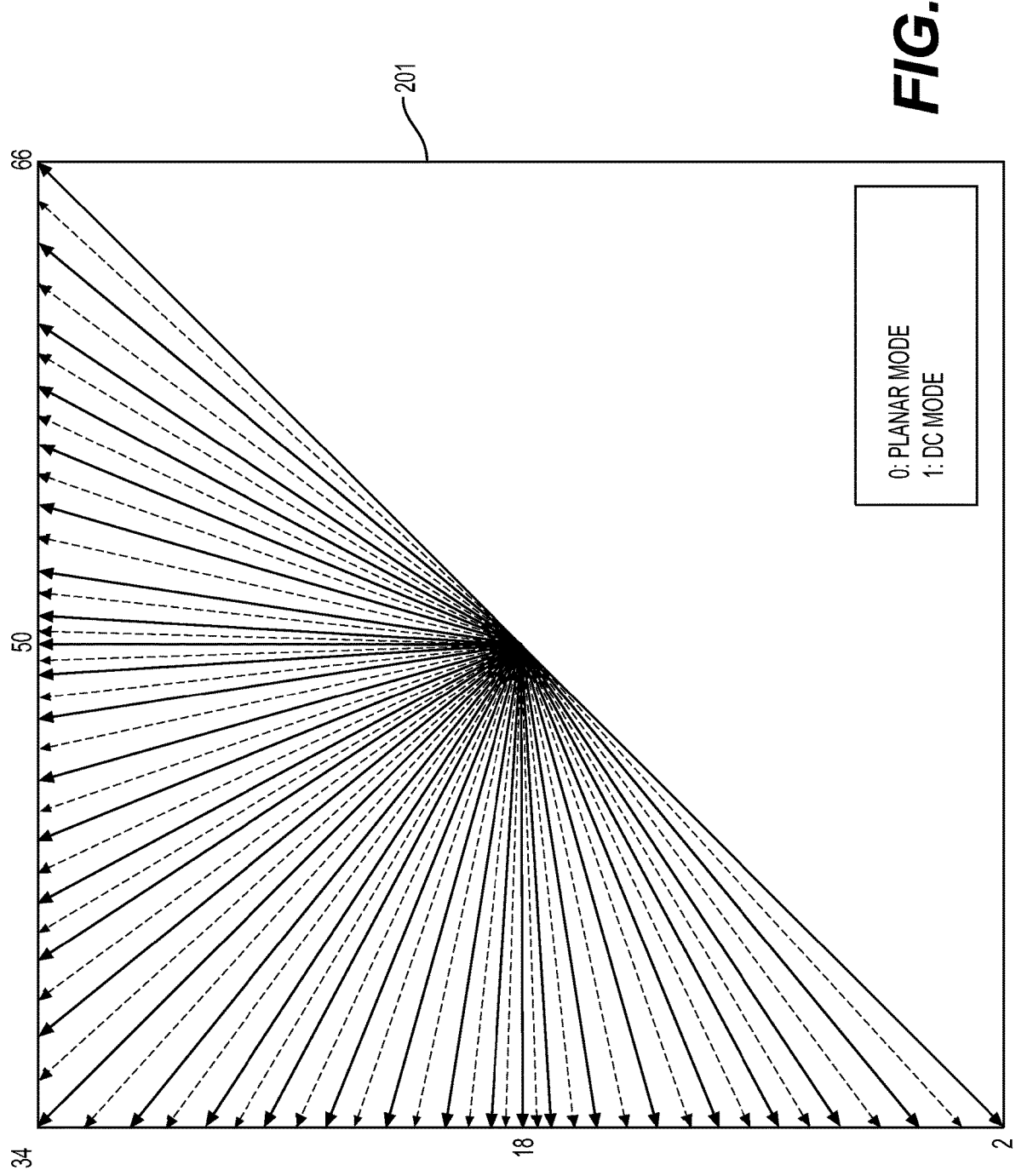
FIG. 2 is an illustration of exemplary intra prediction directions.
Figure 3:
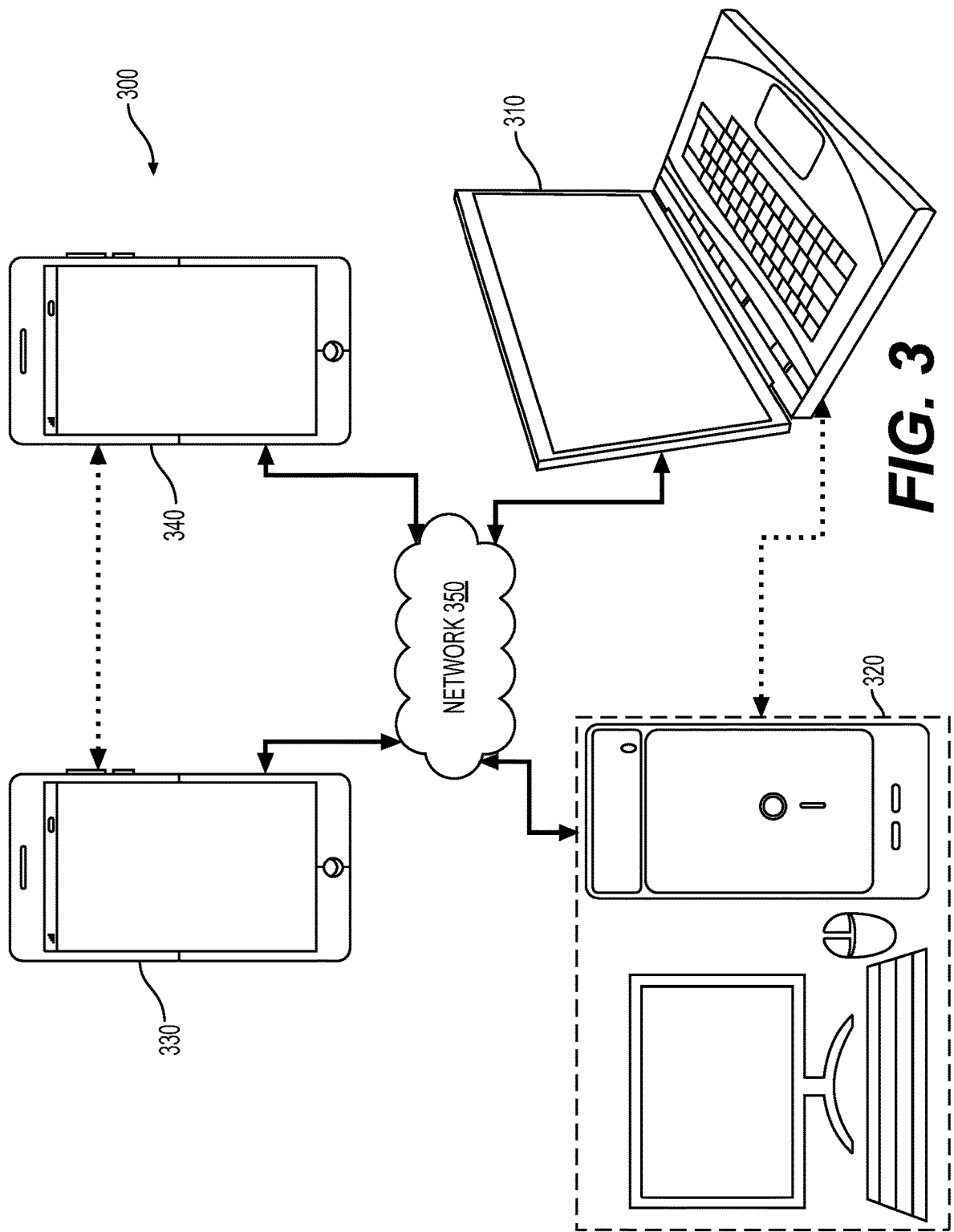
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
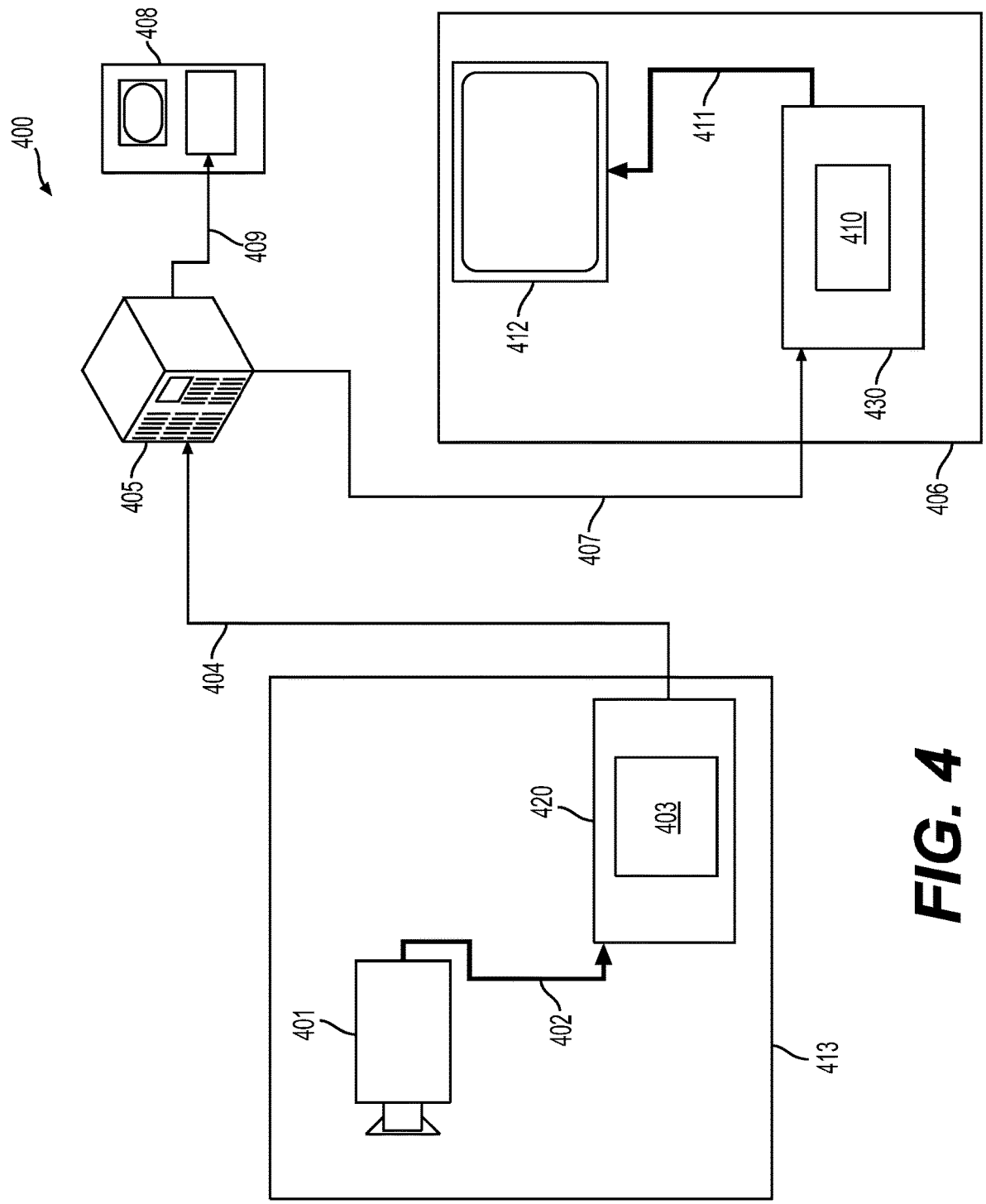
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
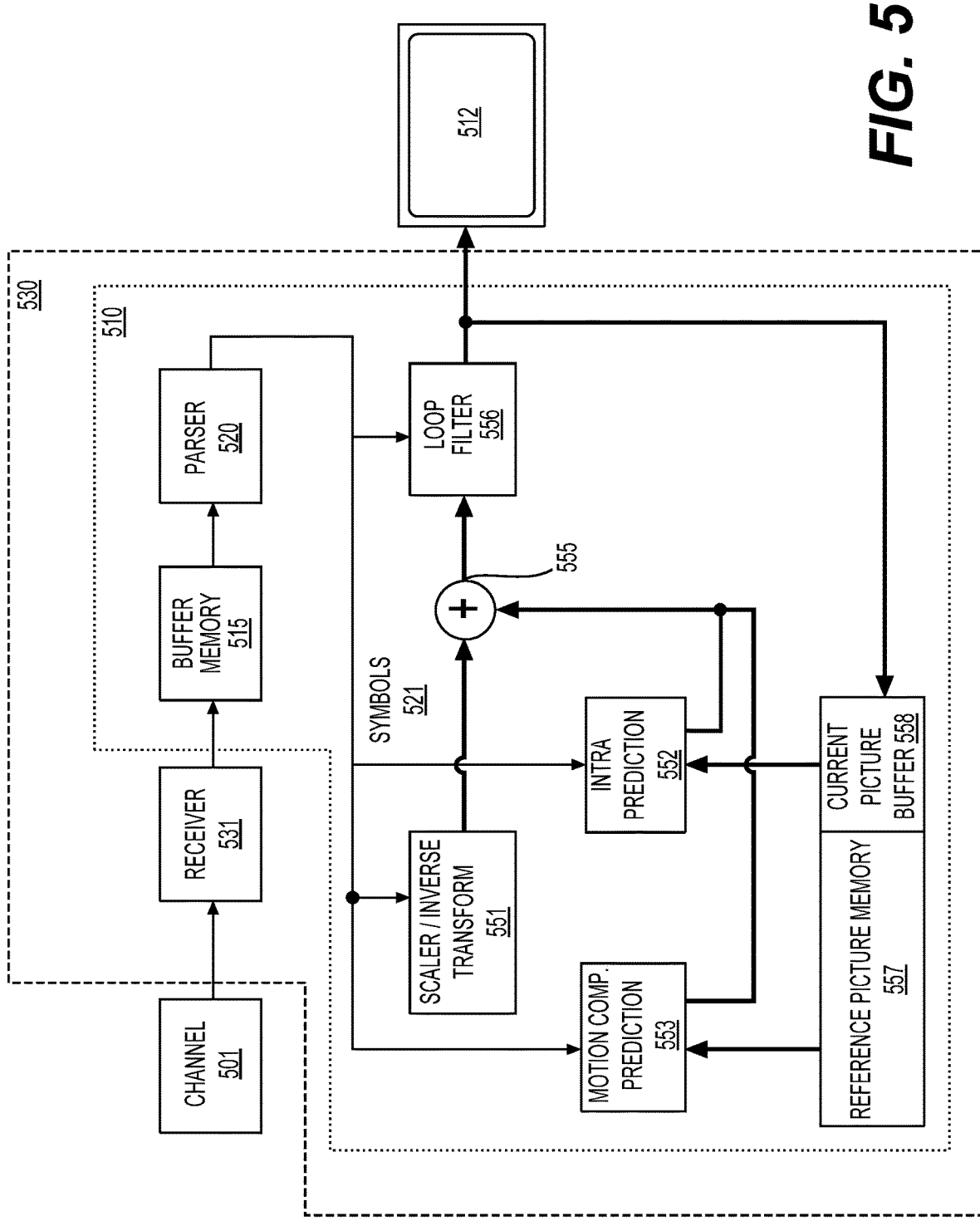
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
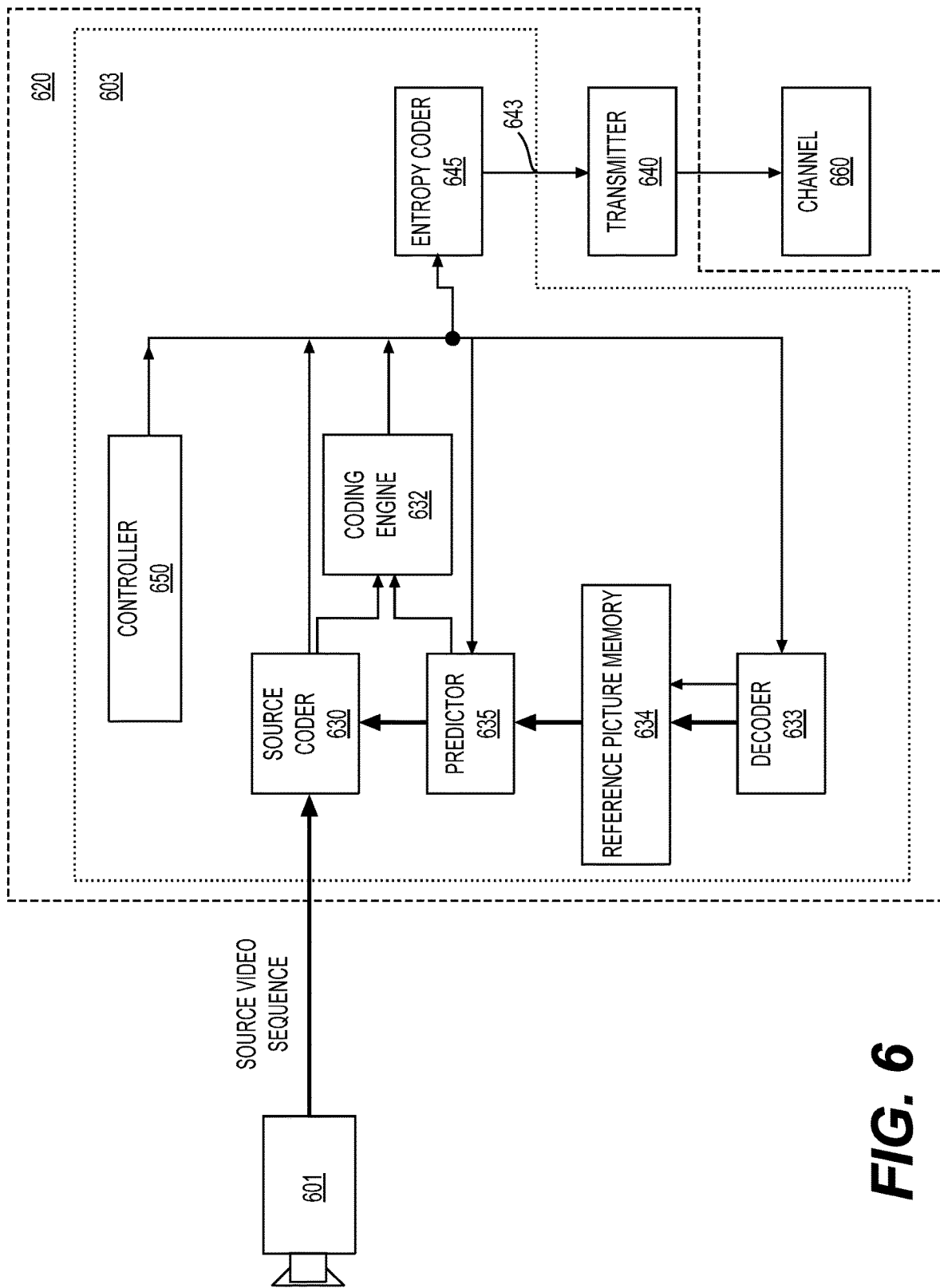
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
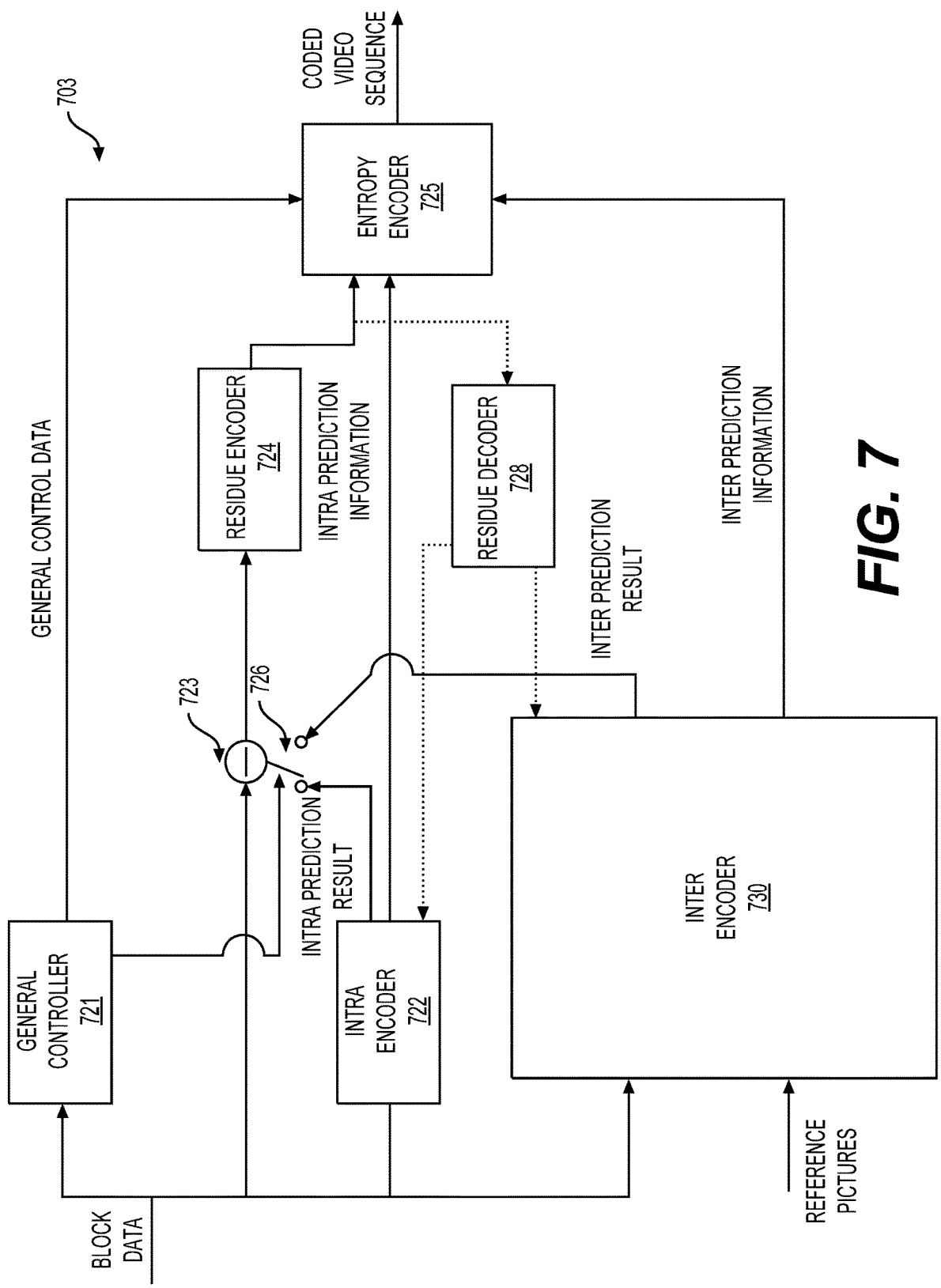
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
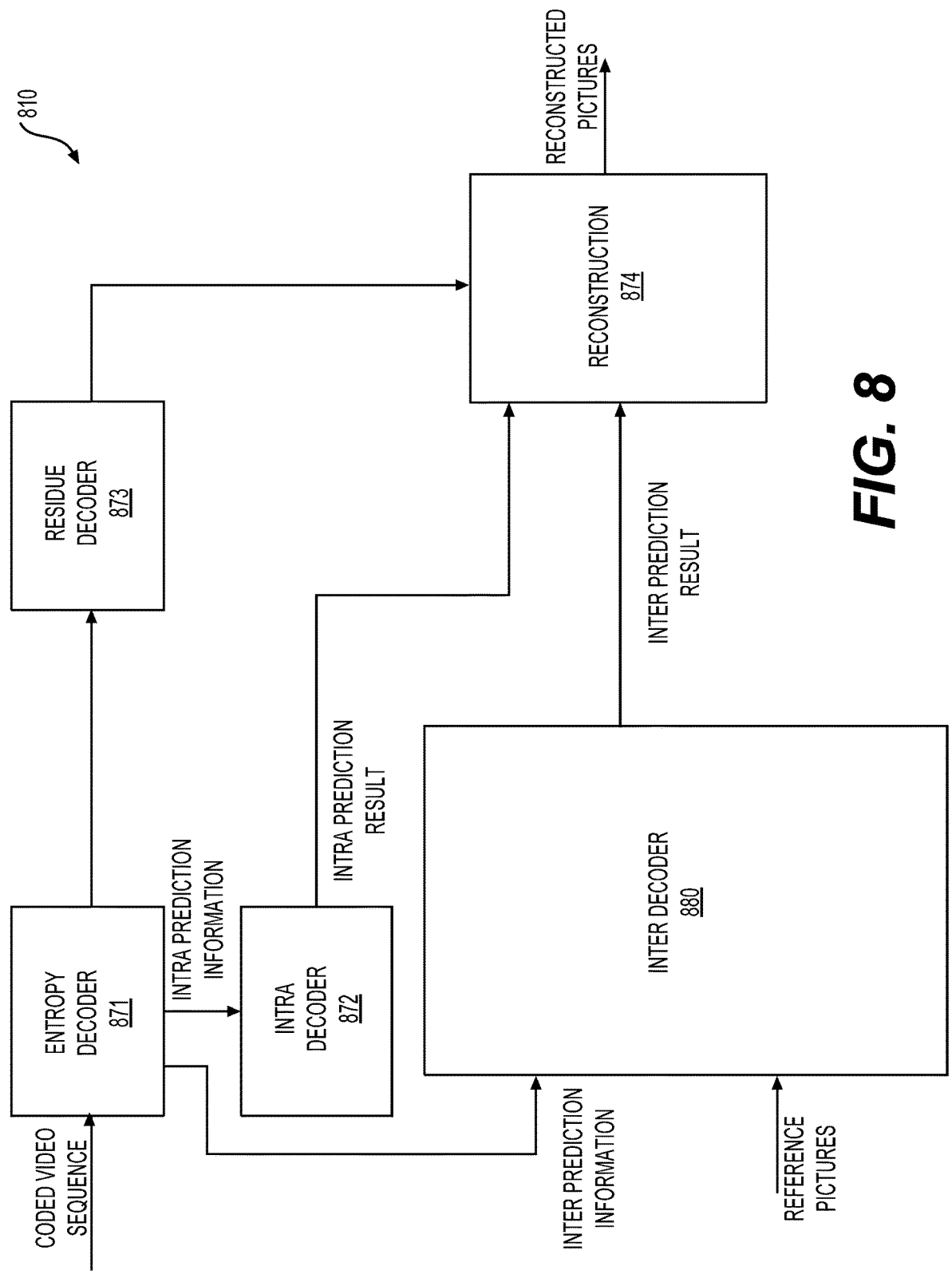
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

II. Wavefront Parallel Processing

Figure 9:
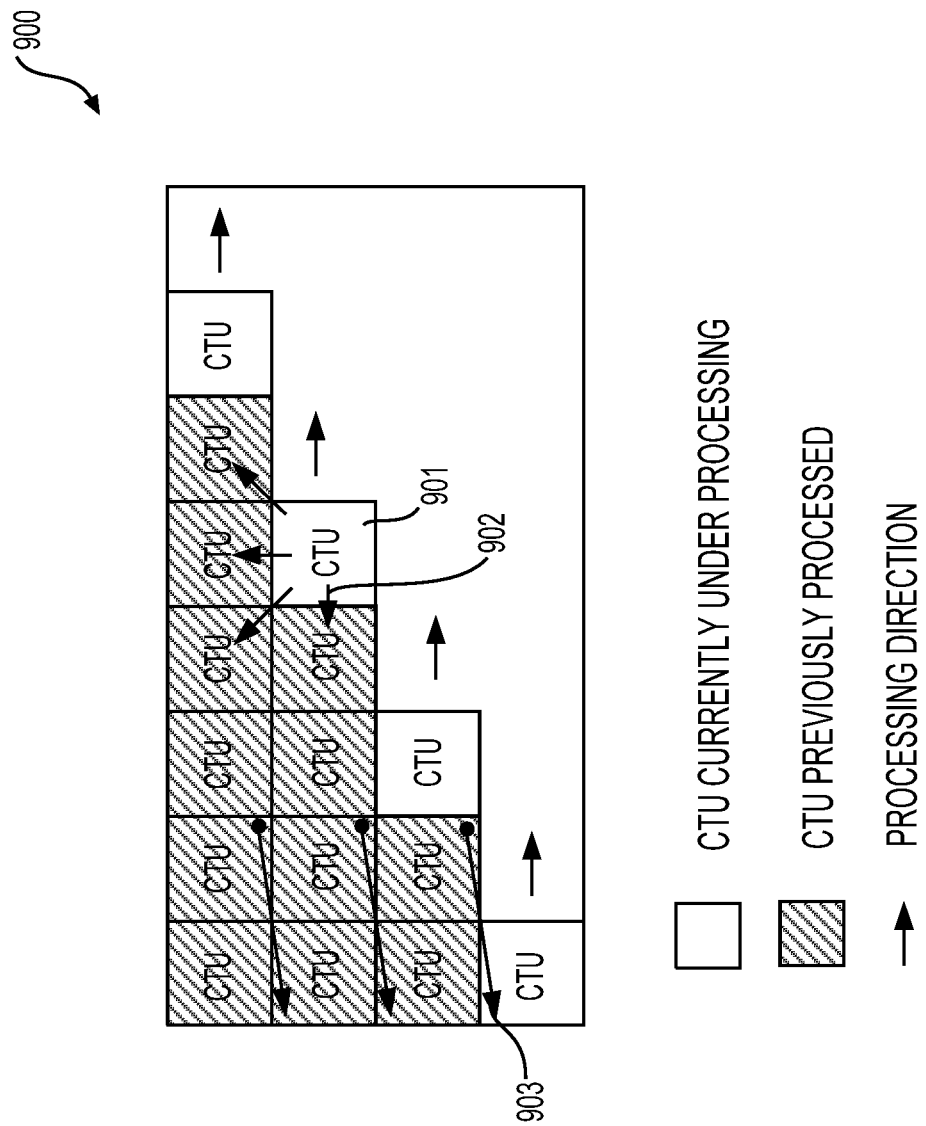
FIG. 9 shows an example of wavefront parallel process (WPP) with a delay of two coding tree units (CTUs).

In some embodiments, wavefront parallel processing (WPP) is used for parallelization. WPP allows the creation of picture partitions that can be processed in parallel without incurring high coding losses. FIG. 9 shows an example of WPP. A picture (or a slice or tile) (900) can be partitioned into, for example, 4 rows of CTUs. Each row of CTUs can be processed in parallel with a delay of two CTUs. A CTU (901) can be decoded after neighboring blocks (left, above, above left, and above right) are decoded. Thus, in-picture prediction between neighboring CTU rows can be employed. For example, decoding of blocks within the CTU (901) can reference neighboring blocks within the left, above, above left, or above right CTUs, as indicated by the arrows (902).

In addition, at the beginning of every CTU row, a context-based adaptive arithmetic doing (CABAC) context is reset using a context of the end of the above right CTU, as indicated by the arrows (903). Accordingly, coding dependencies (in-picture prediction and CABAC context modeling) between neighboring CTU rows can be preserved compared with other parallel coding tools, for example, based on tile or slice partitions. As a result, higher coding efficiency can be achieved.

Figure 10:
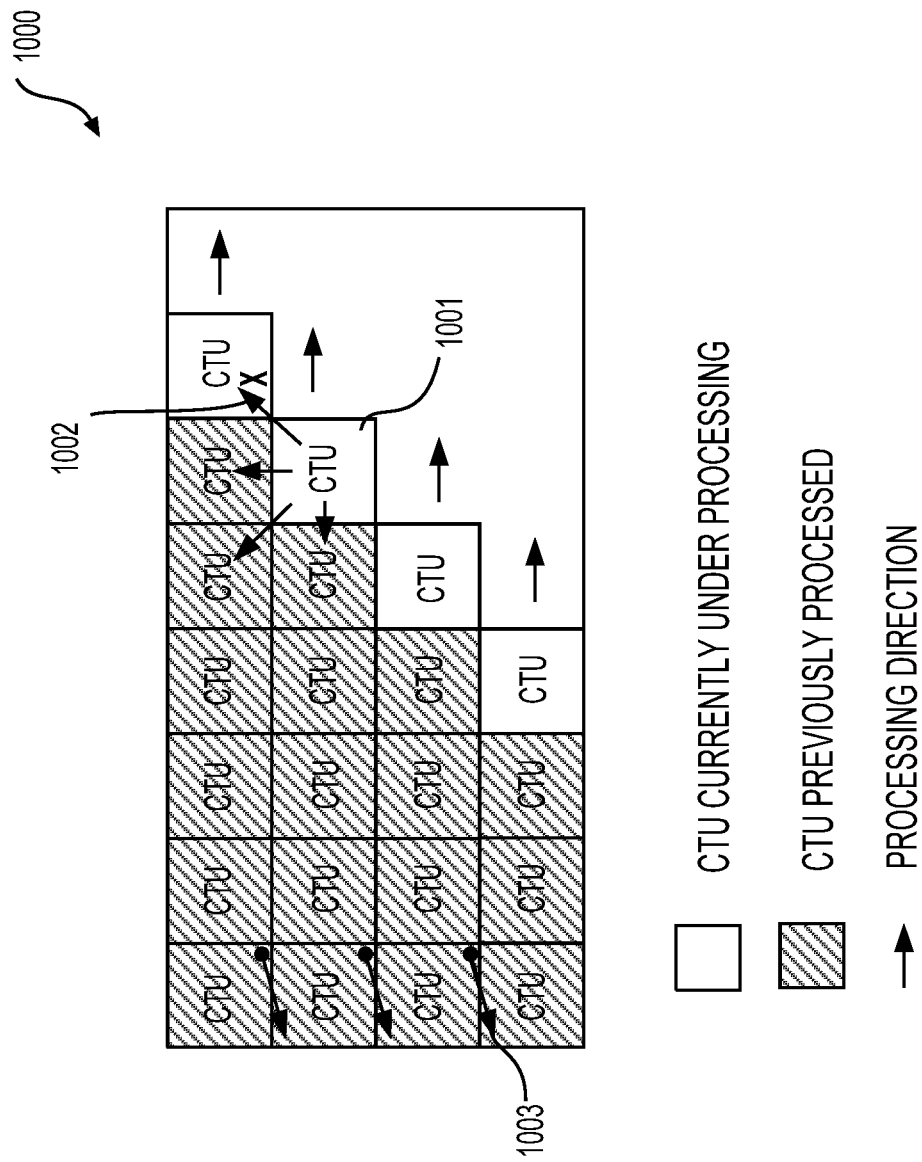
FIG. 10 shows another example of WPP with a delay of one CTU.

In some embodiments, larger CTU sizes, for example, 128×128 pixels, are allowed. WPP with a delay of one CTU can be used. With a larger size of CTU, one CTU could be sufficient for CABAC learning because the number of processed pixels in a 128×128 CTU would be larger than those in two 64×64 CTUs. FIG. 10 shows another example of WPP with a delay of one CTU. Similar to the FIG. 9 example, a picture (or a slice or tile) (1000) can be partitioned into, for example, 4 rows of CTUs. Each row of CTUs can be processed in parallel with a delay of one CTU. A CTU (1001) can be decoded after neighboring blocks (left, above, and above left) are decoded. Referencing blocks within the above right CTU is not allowed, as indicated by the crossed arrow (1002). When processing the first CTU in each row after the first row of CTUs, CABAC probabilities can be inherited from an upper CTU of the first CTU, as indicated by the arrows (1003).

III. Problems in WPP

Using a larger CTU size has a penalty in WPP. For a picture with a certain resolution, using a larger CTU size can decrease parallel processing performance. For example, a larger CTU size will result in a fewer number of CTU rows which, in turn, can result in a smaller number of processing threads that can be parallelized. Additionally, a pipeline delay of WPP can be longer due to a larger CTU size. Further, a larger CTU size can have a greater variance in processing times of processing (e.g., encoding/decoding) a CTU, leading to increased delays in parallel processing.

WPP is processed at the level of CTU row. In some embodiments, CTU size is signaled at a sequence level, for example, contained in a sequence parameter set (SPS), which means there is no flexibility for adapting CTU size in a picture level or a slice level.

When a picture has a height smaller than a width, a picture line buffer size is relatively large because the picture line buffer depends on the number of horizontal pixels and the related side information.

IV. Improvement to WPP

1. Pictures with a Guaranteed Larger Height than a Width

To solve the above problems, in some embodiments, an encoder can be configured to code pictures with a longer picture side as a height and a shorter picture side as a width during a process of encoding a video sequence. In this way, the pictures in the video sequence can each be partitioned into more CTU rows than the case with the shorter picture side as a height. More parallel threads can thus be utilized to obtain a better parallel processing performance when WPP is enabled. In addition, the process may incur a smaller line buffer size due to a shorter picture width.

The decision to encode the video sequence in the above coding mode can be based on certain conditions, such as knowledge of decoder capabilities. For example, when a target decoder is configured with a multiple-core CPU and adequate for parallel processing (potentially WPP), the above coding mode can be enabled.

When the above coding mode is enabled, a syntax element may be signaled to inform a decoder that pictures in a coded video sequence are guaranteed to have a width larger than (or equal to) a height. For example, the syntax element indicates that each picture in the coded video sequence has a width that is larger than a height. Based on this signaling, the decoder can accordingly decode subsequent syntax elements or determine whether WPP can be used for decoding the coded video sequence.

In some embodiments, a high-level syntax element is employed to indicate whether a height of pictures in the coded video sequence is guaranteed to not be smaller than a width of the pictures in the coded video sequence. For example, the high-level syntax element can be used to guarantee that a picture in a video sequence has a height larger than or equal to a width of the picture.

The high-level syntax element can be generated at a video encoder and signaled to a decoder. In an example, the high-level syntax element is signaled in a supplemental enhancement information (SEI) message. In an example, the high-level syntax element is signaled as part of a set of video usability information (VUI) parameters.

Exemplary syntax and semantics of SEI messages and VUI parameters, for example, can be defined by the standard of Versatile Supplemental Enhancement Information Messages for Coded Video Bitstreams (Draft 5), JVET-S2007- v7, Joint Video Experts Team (JVET) of ITU-T SG 16 WP 3 and ISO/IEC JTC 1/SC 29/WG 11, 18th Meeting: by teleconference, 15-24 Apr. 2020. The draft standard is incorporated by reference herein in its entirety. For example, the VUI parameters and SEI messages defined in the above draft standard can be conveyed within coded video bitstreams in a manner specified in a video coding specification or could be conveyed by other means as determined by specifications for systems that make use of such coded video bitstreams. For example, the SEI messages and VUI parameters can be used with coded video bitstreams as specified by Rec. ITU-T H.266, ISO/IEC 23090-3 or other types of coded video bitstreams.

In an example, the high-level syntax element is signaled in a video sequence level, for example, contained in a sequence parameter set (SPS) in a coded video bitstream. In an example, the high-level syntax element is signaled in a picture level, for example, contained in a picture parameter set (PPS). In various examples, the high-level syntax element can be signaled as any type of high-level syntax element that can be referenced when decoding a picture.

In some embodiments, the high-level syntax element is a flag denoted as width_smaller_than_height_flag. The flag can be signaled in any level of a coded video bitstream or outside the coded video bitstream. In an example, when the flag has a first value, such as the value of 1, the flag can indicate a video sequence or a picture referencing the flag has a picture width smaller than a picture height. When the flag has a second value, such as the value of 0, the flag can indicate a video sequence or a picture referencing the flag may or may not have a picture width smaller than a picture height. For example, the second value can indicate that it is not known whether the picture width is smaller than the picture height from a decoder's perspective.

In an example, when the flag is not signaled in the coded video bitstream, a decoder can infer the flag has a certain value. In one example, the flag is inferred to have a value indicating a video sequence or a picture referencing the flag may or may not have a picture width smaller than a picture height. In another example, when the flag is not signaled in the coded video bitstream, a decoder can infer the flag has a value indicating a video sequence or a picture referencing the flag has a picture width smaller than a picture height.

In an example, the width_smaller_than_height_flag can be signled in an SPS as shown in Table 1 below.

TABLE 1

|  | Descriptor |
| --- | --- |
| seq_parameter_set_rbsp( ) { | |
| ... | ... |
| width_smaller_than_height_flag | u(1) |
| ... | ... |

In some embodiments, after receiving or inferring the width_smaller_than_height_flag, a decoder can proceed to accordingly decode a video sequence or a picture referencing the flag. For example, based on a value of the width_smaller_than_height_flag, the decoder can decode syntax elements to determine a width and a height of the video sequence or the picture.

In an embodiment, when the width_smaller_than_height_flag has a value indicating a picture width is guaranteed to be smaller than a picture height for a video sequence (or the picture), the picture width can be signaled with a first syntax element (e.g., in an SPS or PPS), and a difference between the picture height and the picture width is signaled with a second syntax element (e.g., in the SPS or PPS). The second syntax element can be signaled as an unsigned integer as the picture height is always larger than (or equal to) the picture width and a sign of the difference value is not needed. In an example, the first syntax element is signaled before the second syntax element in a coded video bitstream. In an example, the second syntax element is signaled before the first syntax element. In some examples, the first syntax element is used to represent the picture height instead of the picture width, and the second syntax element is still used to represent the difference.

Given the above configuration of signaling the first and second syntax elements, based on the predefined semantics of the first and second syntax elements, the decoder can accordingly properly interpret the first and second syntax elements in response to receiving the width_smaller_than_height_flag having the value indicating the picture width is guaranteed to be smaller than the picture height for a video sequence (or a picture).

In an embodiment, when the width_smaller_than_height_flag has a value indicating a picture width may or may not be smaller than a picture height for a video sequence (or a picture) referencing the flag, the picture width and the picture height may be signaled with different syntax elements, respectively. For example, the picture width is indicated by a first syntax element, while the picture height is indicated by a second syntax element. The decoder may accordingly decode these two syntax elements to determine the picture width and the picture height upon receiving the flag.

In an example, after receiving or inferring the width_smaller_than_height_flag, the decoder can determine which parallel processing coding method is used for decoding the video sequence or picture based on a value of the width_smaller_than_height_flag. For example, candidate coding methods for parallel processing can include tiles, WPP, slices, subpictures, and the like. In an embodiment, when the flag indicates the picture height is guaranteed to be larger than the picture width, the decoder may determine that WPP is to be used for decoding the video sequence. Other factors (e.g., CTU size) may be considered in combination with the width_smaller_than_height_flag for making the above choice. In an embodiment, when the width_smaller_than_height_flag is signaled, syntax elements indicating enablement of certain parallel processing methods other than WPP may not be signaled and can be inferred by a decoder to save coded bits.

In some embodiments, when an input video sequence at an encoder has a height smaller than a width, a pre-processing can be performed over the input video sequence to guarantee that a pre-processed video sequence has a width larger than a height. For example, as a result of the pre-processing, an orientation can change and the width and height of the input video sequence become the height and the width of the pre-processed video sequence.

In an example, a rotation operation can be performed over the input video sequence to generate the pre-processed video sequence. For example, the input video sequence can be rotated 90 degrees clockwise or anticlockwise. When being rotated 90 degrees clockwise, pixels at the left side of a picture in the input video sequence would be moved to the top side of a picture in the pre-processed video sequence. When being rotated 90 degrees anticlockwise, pixels at the left side of a picture in the input video sequence would be moved to the bottom side of a picture in the pre-processed video sequence. In either case, the width and height of the input video sequence become the height and the width of the pre-processed video sequence.

Corresponding to the above pre-processed video sequence, width information can first be signaled, for example, in an SPS. Then, a difference between the height and the width can be signaled as an unsigned integer, for example, in the SPS. Coded bits for signaling the height and width can thus be saved.

In an example, there is no signaling of whether a rotation operation takes place at the encoder in a coded video bitstream corresponding to the pre-processed video sequence. In another example, a syntax indicating whether a rotation operation is performed can be signaled in a coded video bitstream corresponding to the pre-processed video sequence.

In some embodiments, in combination with the pre-processing to guarantee a picture width being smaller than a picture height for a coded video sequence, the high-level syntax element e.g., width_smaller_than_height_flag) described above can be signaled to indicate whether the height is guaranteed not to be smaller than the width in the coded video sequence. Corresponding to the pre-processing, the high-level syntax element can be set to a value of 1, for example. For example, no matter the pre-processing (e.g., the rotation operation) is performed or not (depending on the lengths of the height and width of an input video sequence), the high-level syntax element can be signaled to indicatethe height is guaranteed to not be smaller than the width in the coded video sequence.

In contrast, when no pre-processing is enabled at the encoder, the high-level syntax element can be signaled to indicate that the width may or may not be smaller than the height in the coded video sequence. Or, the high-level syntax element is not signaled and can be inferred by a decoder to have a value indicating that the width may or may not be smaller than the height.

In an example, with the pre-processing to guarantee a picture height being larger than a picture width for a coded video sequence, the high-level syntax element is not signaled for indicating whether the height is guaranteed to not be smaller than the width in the coded video sequence. For example, the pre-processing can be specified in a video coding standard (such as VVC). Accordingly, the decoder and encoder can have a same understanding that the height is guaranteed to not be smaller than the width. The decoder can accordingly decode some syntax elements, for example, to obtain the picture width and height with an assumption that the picture height is larger than the picture width or make decisions about how to select a suitable parallel processing method from multiple candidate parallel processing methods.

2. Flexible CTU Sizes

As described above, CTU size can affect WPP coding performance and can be signaled, for example, in an SPS, in some embodiments. To achieve a better WPP coding performance for a specific picture or a region in a picture, in some embodiments, a CTU size can be signaled at a picture level or a slice level instead of being signaled in a sequence level. For example, a CTU size can be signaled in a PPS or a slice header. Different pictures or slices can thus have different CTU sizes, resulting in different numbers of CTU rows. In this way, different granularities of WPP can be achieved.

In some examples, different types of slices can use different CTU sizes. In some embodiments, there can be three types of slices: I, P and B slices. I slices use intra prediction, P slices may use both intra prediction and inter prediction with one reference picture list, and B slices may use both intra prediction and inter prediction with two reference picture lists. In an example, a smaller CTU size can be used for intra coded slices (I slices) so that more WPP threads can be used to accelerate the processing speed of the intra coded slices. In an example, a larger CTU size is used for other types of slices with a higher temporal level (such as P slices or B slices) so that less WPP threads are needed. In some cases, the processing complexity of I slices is higher than B or P slices. In some examples, applying different CTU sizes (different number of threads) for different types of slices can balance the processing time (or workload) for different slices, resulting in an overall shorter processing time for a picture including those slices.

In some examples, a CTU size can be signaled at a tile level or a subpicture level, such that different tiles or subpictures can have different CTU sizes and thus different CTU rows and WPP threads.

In some embodiments, signaling of a CTU size at picture level (PPS level) and a slice level can be combined with signaling of a CTU size at a sequence level (SPS level). In an example, a maximum CTU size can be signaled at a SPS level, while at other levels, such as a picture level and/or a slice level, a smaller CTU size may be further signaled to allow more WPP threads at that level. For pictures or slices that use the maximum CTU size signaled at a SPS level, there can be no signaling of a CTU size for those pictures or slices to save coded bits.

In an example, a CTU size is signaled at a sequence level, while at other levels, such as a picture level and/or a slice level, a smaller or larger CTU size can be further signaled to allow more or less WPP threads at that level. Similarly, for pictures or slices that use a same CTU size as that signaled at the sequence level, there can be no signaling of CTU size.

Figure 11:
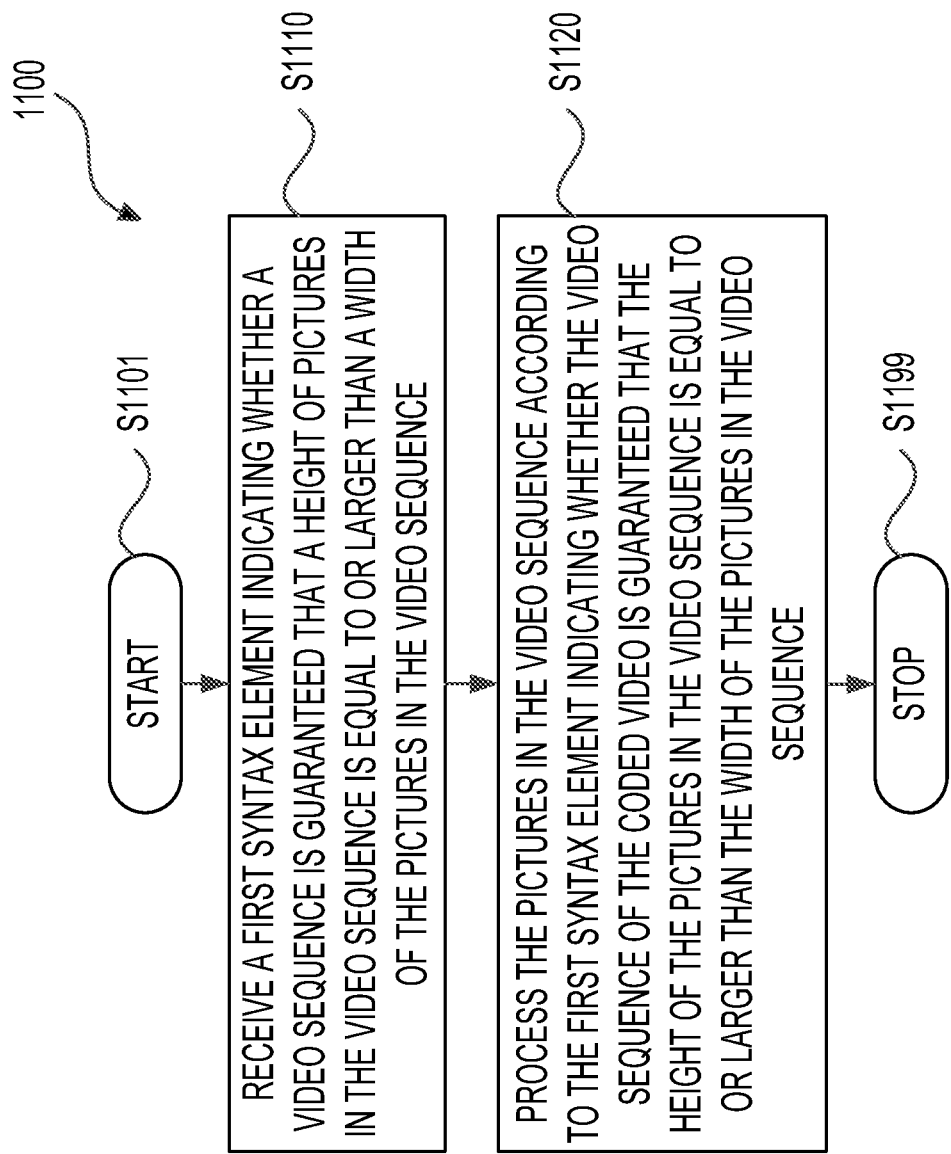
FIG. 11 shows a flowchart outlining a process (1100) according to an embodiment of the disclosure.

V. Processes with a Picture Width Being Guaranteed to Be Smaller than a Picture Height FIG. 11 shows a flowchart outlining a process (1100) according to an embodiment of the disclosure. The process (1100) can be used in the reconstruction of a block. In various embodiments, the process (1100) is executed by processing circuitry, such as the processing circuitry in the terminal devices (310), (320), (330) and (340), the processing circuitry that performs functions of video processing, such as in the video decoder (410), the processing circuitry that performs functions of the video decoder (510), and the like. In some embodiments, the process (1100) is implemented in software instructions, and thus when the processing circuitry executes the software instructions, the processing circuitry performs the process (1100). The process starts at (S1101) and proceeds to (S1110).

At (S1110), a first syntax element can be received in a coded video bitstream. The first syntax element can indicate whether a height of each of a plurality of pictures in a video sequence of the coded video bitstream is equal to or larger than a width of the respective picture in the video sequence. The first syntax element can be transmitted as a high-level syntax element. For example, the first syntax element can be transmitted in an SEI message, a VUI parameter set (or referred to as a VUI syntax structure), an SPS, and the like.

In an example, a first value of the first syntax element indicates the width of each of the pictures in the video sequence is smaller than the height of the respective picture in the video sequence, and a second value of the first syntax element indicates the width of the pictures in the video sequence may or may not be smaller than the height of the pictures in the video sequence. In an embodiment, the first syntax element is not signaled in the bitstream. The decoder can infer the value of the first syntax element to be the second value.

In an embodiment, an input video sequence corresponding to the video sequence of the coded video bitstream at an encoder has a height smaller than a width. The height of the input video sequence is coded as the width of the pictures in the video sequence of the coded video bitstream, and the width of the input video sequence is coded as the height of the pictures in the video sequence of the coded video bitstream. For example, a rotation pre-processing can be performed at the encoder to switch the height and the width of the pictures in an input video sequence.

In an embodiment, a second syntax element indicating the width of the pictures in the video sequence can further be received. A third syntax element indicating a difference between the height of the pictures in the video sequence and the width of the pictures in the video sequence can be received. The difference can be an unsigned integer. For example, when the first syntax element indicates the video sequence of the coded video is guaranteed that the height of pictures in the video sequence is equal to or larger than the width of the pictures in the video sequence, the second syntax and the third syntax can be signaled in the bitstream.

In an embodiment, a plurality of fourth syntax elements can be received in the coded video bitstream. The plurality of fourth syntax elements can each be associated with a respective one of a plurality of slices in the video sequence. The plurality of fourth syntax elements can indicate different CTU sizes for the respective slices that are of different types. For example, among the plurality of the slices, a slice of type I has a smaller CTU size than a slice of type B or type P.

In an embodiment, a fifth syntax element can be received. The fifth syntax element can be signaled in a picture level in the coded video bitstream. The fifth syntax element can indicate a CTU size for one of the pictures in the video sequence. In an example, the fourth syntax elements and the fifth syntax element are both transmitted for the video sequence. In an example, for usage of the fourth and fifth syntax elements, only the fourth syntax elements or only the fifth syntax are transmitted for the video sequence.

In some embodiments, signaling of CTU size in a sequence level and signaling of CTU size in a picture or a slice level can be combined such that different pictures or slices can use different CTU sizes. For example, a sixth syntax element can be received. The sixth element can be included in an SPS in the bitstream and indicate a first CTU size of the video sequence. Along with the sixth syntax element, a seventh syntax element that is signaled at picture level or slice level can be received. The seventh syntax can indicate a second CTU size of a respective picture or a respective slice in the video sequence. In an example, the first CTU size is a maximum CTU size of the video sequence, and the second CTU size is smaller than the maximum CTU size.

At (S1120), the pictures in the video sequence of the coded video can be processed in an orientation that is determined according to the first syntax element indicating whether the height of each of the plurality of pictures in the video sequence of the coded video is is equal to or larger than the width of the respective picture in the video sequence.

For example, when the first syntax element has a value or is inferred to have a value indicating that the height of the pictures in the video sequence is not guaranteed to be equal to or larger than the width of the pictures in the video sequence, the decoder may proceed to decode the video sequence in a similar manner as specified in the current HEVC or VVC standard.

When the first syntax element has a value or is inferred to have a value indicating that the height of the pictures in the video sequence is guaranteed to be equal to or larger than the width of the pictures in the video sequence, the decoder may proceed to determine the picture width and height based on the second and the third syntax elements. Also, the decoder may determine to select WPP from multiple candidate parallel processing methods to process a picture in the video sequence based on the first syntax element and optionally other factors.

The decoder may further determine a CTU size of a picture or a slice based on the fourth and fifth syntax elements or the sixth and seventh syntax elements. Subsequently, the decoder may determine a number of threads used for processing the picture or the slice. The decoder may accordingly configure software or hardware resources to process the picture or the slice using the WPP method. As a result, reconstructed pictures corresponding to the video sequence can be generated. The process (1100) can proceed to (S1199) and terminate at (S1199).

VI. Computer System

The techniques described above, can be implemented as computer software using computer-readable instructions and physically stored in one or more computer-readable media. For example, FIG. 12 shows a computer system (1200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 12:
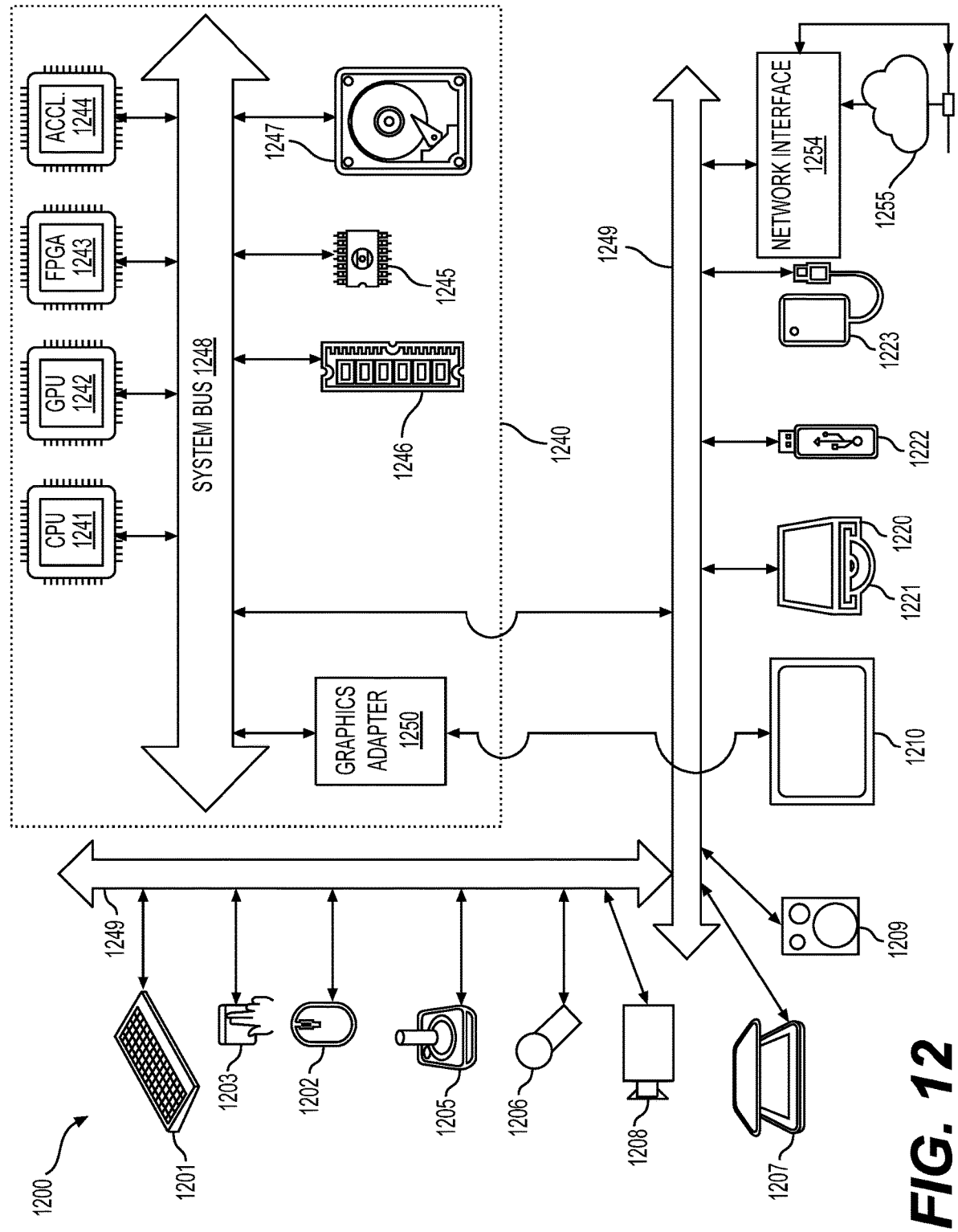
FIG. 12 is a schematic illustration of a computer system in accordance with an embodiment.

The components shown in FIG. 12 for computer system (1200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1200).

Computer system (1200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1201), mouse (1202), trackpad (1203), touch screen (1210), data-glove (not shown), joystick (1205), microphone (1206), scanner (1207), camera (1208).

Computer system (1200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1210), data-glove (not shown), or joystick (1205), but there can also be tactile feedback devices that do not serve as input devices), audio output devices (such as: speakers (1209), headphones (not depicted)), visual output devices (such as screens (1210) to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system (1200) can also include human accessible storage devices and their associated media such as optical media including CD/DVD ROM/RW (1220) with CD/DVD or the like media (1221), thumb-drive (1222), removable hard drive or solid-state drive (1223), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (1200) can also include an interface (1254) to one or more communication networks (1255). Networks can, for example, be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide-area digital networks to include cable TV, satellite TV, and terrestrial broadcast TV, vehicular and industrial to include CANBus, and so forth. Certain networks commonly require external network interface adapters that attached to certain general purpose data ports or peripheral buses (1249) (such as, for example USB ports of the computer system (1200)); others are commonly integrated into the core of the computer system (1200) by attachment to a system bus as described below (for example Ethernet interface into a PC computer system or cellular network interface into a smartphone computer system). Using any of these networks, computer system (1200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1240) of the computer system (1200).

The core (1240) can include one or more Central Processing Units (CPU) (1241), Graphics Processing Units (GPU) (1242), specialized programmable processing units in the form of Field Programmable Gate Areas (FPGA) (1243), hardware accelerators for certain tasks (1244), graphics adapters (1250), and so forth. These devices, along with Read-only memory (ROM) (1245), Random-access memory (1246), internal mass storage such as internal non-user accessible hard drives, SSDs, and the like (1247), may be connected through a system bus (1248). In some computer systems, the system bus (1248) can be accessible in the form of one or more physical plugs to enable extensions by additional CPUs, GPU, and the like. The peripheral devices can be attached either directly to the core's system bus (1248), or through a peripheral bus (1249). In an example, the screen (1210) can be connected to the graphics adapter (1250). Architectures for a peripheral bus include PCI, USB, and the like.

CPUs (1241), GPUs (1242), FPGAs (1243), and accelerators (1244) can execute certain instructions that, in combination, can make up the aforementioned computer code. That computer code can be stored in ROM (1245) or RAM (1246). Transitional data can be also be stored in RAM (1246), whereas permanent data can be stored for example, in the internal mass storage (1247). Fast storage and retrieval to any of the memory devices can be enabled through the use of cache memory, that can be closely associated with one or more CPU (1241), GPU (1242), mass storage (1247), ROM (1245), RAM (1246), and the like.

The computer-readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1200), and specifically the core (1240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1240) that are of non-transitory nature, such as core-internal mass storage (1247) or ROM (1245). The software implementing various embodiments of the present disclosure can be stored in such devices and executed by core (1240). A computer-readable medium can include one or more memory devices or chips, according to particular needs. The software can cause the core (1240) and specifically the processors therein (including CPU, GPU, FPGA, and the like) to execute particular processes or particular parts of particular processes described herein, including defining data structures stored in RAM (1246) and modifying such data structures according to the processes defined by the software. In addition or as an alternative, the computer system can provide functionality as a result of logic hardwired or otherwise embodied in a circuit (for example: accelerator (1244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method of video processing by a video processor, comprising:
    receiving a first syntax element in a coded video bitstream, the first syntax element being a high level syntax element and indicating whether a height of each of a plurality of pictures in a video sequence of the coded video bitstream is guaranteed to be equal to or larger than a width of the respective picture in the video sequence of the coded video bitstream;
    receiving a second syntax element indicating the width of the pictures in the video sequence;
    receiving a third syntax element indicating a difference between the height of the pictures in the video sequence and the width of the pictures in the video sequence, the difference being an unsigned integer; and
    processing the pictures in the video sequence of the coded video bitstream in an orientation that is determined according to the first syntax element indicating whether the height of each of the plurality of pictures in the video sequence of the coded video bitstream is equal to or larger than the width of the respective picture in the video sequence.

2. The method of claim 1, wherein the first syntax element is transmitted in a supplemental enhancement information (SEI) message, a video usability information (VUI) parameter set, or a sequence parameter set (SPS).

3. The method of claim 1, wherein a first value of the first syntax element indicates the width of each of the pictures in the video sequence is smaller than the height of the respective picture in the video sequence.

4. The method of claim 3, wherein a second value of the first syntax element indicates the width of the pictures in the video sequence may or may not be smaller than the height of the pictures in the video sequence.

5. The method of claim 4, further comprising:
    inferring the first syntax element to have the second value when the first syntax element is not signaled in the coded video bitstream.

6. The method of claim 1, wherein an input video sequence corresponding to the video sequence of the coded video bitstream at an encoder has a height smaller than a width, and
    the height of the input video sequence is coded as the width of the pictures in the video sequence of the coded video bitstream, and the width of the input video sequence is coded as the height of the pictures in the video sequence of the coded video bitstream.

7. The method of claim 1, wherein the processing the pictures in the video sequence comprises:
    determining the height of the pictures in the video sequence to be a sum of a value of the width indicated by the second syntax element and the unsigned integer.

8. The method of claim 1, wherein the processing the pictures in the video sequence comprises:
    in response to the first syntax element indicating that the height of each of the pictures in the video sequence of the coded video bitstream is equal to or larger than the width of each of the pictures in the video sequence, processing one or more of the pictures in the video sequence using wavefront parallel processing (WPP).

9. The method of claim 1, further comprising:
    receiving a fourth syntax element that is signaled in a slice level in the coded video bitstream, the fourth syntax element indicating a coding tree unit (CTU) size for a slice in the video sequence.

10. The method of claim 1, further comprising:
    receiving a plurality of fourth syntax elements that are each associated with a respective one of a plurality of slices in the video sequence, the plurality of fourth syntax elements indicating different CTU sizes for the respective slices of different types.

11. The method of claim 10, wherein among the plurality of the slices, a slice of type I has a smaller CTU size than other slice types.

12. The method of claim 1, further comprising:
    receiving a fifth syntax element that is signaled in a picture level in the coded video bitstream, the fifth syntax element indicating a CTU size for one of the pictures in the video sequence.

13. The method of claim 1, further comprising:
    receiving a sixth syntax element that is included in a sequence parameter set (SPS) in the coded video bitstream and indicates a first CTU size of the video sequence; and receiving a seventh syntax element that is signaled at a picture level or a slice level and indicates a second CTU size of a respective picture or a respective slice in the video sequence.

14. The method of claim 13, wherein the first CTU size is a maximum CTU size of the video sequence, and the second CTU size is smaller than the maximum CTU size.

15. An apparatus of video processing, comprising circuitry configured to:
receive a first syntax element in a coded video bitstream, the first syntax element being a high level syntax element that includes a flag indicating whether a height of each of a plurality of pictures in a video sequence of the coded video bitstream is guaranteed to be equal to or larger than a width of the respective picture in the video sequence of the coded video bitstream;
receive a second syntax element indicating the width of the pictures in the video sequence;
receive a third syntax element indicating a difference between the height of the pictures in the video sequence and the width of the pictures in the video sequence, the difference being an unsigned integer; and
process the pictures in the video sequence of the coded video bitstream in an orientation that is determined according to the first syntax element indicating whether the height of each of the plurality of pictures in the video sequence of the coded video bitstream is equal to or larger than the width of the respective picture in the video sequence.

16. The apparatus of claim 15, wherein the first syntax element is transmitted in a supplemental enhancement information (SEI) message, a video usability information (VUI) parameter set, or a sequence parameter set (SPS).

17. The apparatus of claim 15, wherein a first value of the first syntax element indicates the width of each of the pictures in the video sequence is smaller than the height of the respective picture in the video sequence.

18. The apparatus of claim 17, wherein a second value of the first syntax element indicates the width of the pictures in the video sequence may or may not be smaller than the height of the pictures in the video sequence.

19. A method of video processing, comprising:
including, in a coded video bitstream, a first syntax element, a second syntax element, and a third syntax element, the first syntax element being a high level syntax element that includes a flag indicating whether a height of each of a plurality of pictures in a video sequence of the coded video bitstream is guaranteed to be equal to or larger than a width of the respective picture in the video sequence of the coded video bitstream, the second syntax element indicating the width of the pictures in the video sequence, and the third syntax element indicating a difference between the height of the pictures in the video sequence and the width of the pictures in the video sequence, the difference being an unsigned integer,
wherein the pictures in the video sequence of the coded video bitstream are processed in an orientation that is determined according to the first syntax element indicating whether the height of each of the plurality of pictures in the video sequence of the coded video bitstream is equal to or larger than the width of the respective picture in the video sequence of the coded video.

* * * * *